United States Patent
Bar et al.

(10) Patent No.: US 9,813,242 B2
(45) Date of Patent: Nov. 7, 2017

(54) METHOD AND APPARATUS FOR SECURE RECORDATION OF TIME OF ATTEMPTED BREACH OF IC PACKAGE

(71) Applicant: Freescale Semiconductor, Inc., Austin, TX (US)

(72) Inventors: Ron-Michael Bar, Ramat Hasharon (IL); Yaron Alankry, Raanana (IL); Eran Glickman, Rishon le Zion (IL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/749,749

(22) Filed: Jun. 25, 2015

(65) Prior Publication Data

US 2016/0380769 A1 Dec. 29, 2016

(51) Int. Cl.
G06F 21/50 (2013.01)
G06F 21/55 (2013.01)
G06F 21/87 (2013.01)
H04L 9/30 (2006.01)
G06F 12/14 (2006.01)

(52) U.S. Cl.
CPC .............. *H04L 9/30* (2013.01); *G06F 12/14* (2013.01); *G06F 21/50* (2013.01); *G06F 21/87* (2013.01); *G06F 21/55* (2013.01); *G06F 2212/72* (2013.01)

(58) Field of Classification Search
CPC ........ G06F 21/50; G06F 21/55; G06F 21/552; G06F 21/554
See application file for complete search history.

(56) References Cited

U.S. PATENT DOCUMENTS

| | | | |
|---|---|---|---|
| 7,613,924 B2 | 11/2009 | Shankar et al. | |
| 8,175,276 B2 | 5/2012 | Tkacik et al. | |
| 8,331,189 B1* | 12/2012 | Pancoast | G06F 21/79 365/149 |
| 2009/0040063 A1* | 2/2009 | Yearsley | G06F 21/558 340/693.3 |
| 2010/0017879 A1* | 1/2010 | Kuegler | G06F 21/123 726/23 |
| 2010/0070791 A1* | 3/2010 | Priel | G06F 21/81 713/340 |
| 2010/0220558 A1* | 9/2010 | Pindi | G06F 1/14 368/155 |
| 2010/0312920 A1* | 12/2010 | Johnson | G06F 21/554 710/14 |
| 2012/0198242 A1* | 8/2012 | Dalzell | G06F 21/55 713/190 |
| 2014/0049290 A1* | 2/2014 | Meijer | G06F 11/3024 327/1 |
| 2015/0130636 A1* | 5/2015 | Bowling | G01R 22/066 340/870.09 |

\* cited by examiner

*Primary Examiner* — Khang Do

(57) ABSTRACT

An integrated circuit (IC) package includes a storage element and a protection component coupled to the storage element. The protection component includes a breach detection component configured to detect an attempted breach of the IC package. The protection component further includes a time detection component configured to determine a breach timestamp associated with a time of occurrence of the attempted breach and configured to store a representation of the breach timestamp in the storage element. The storage element may be configured to store a sensitive datum, and the time detection component may be configured to store the representation of the breach timestamp by overwriting the sensitive datum in the storage element with the representation of the breach timestamp.

18 Claims, 5 Drawing Sheets

US 9,813,242 B2

METHOD AND APPARATUS FOR SECURE RECORDATION OF TIME OF ATTEMPTED BREACH OF IC PACKAGE

BACKGROUND

Field of the Disclosure

The present disclosure relates generally to encryption and other data security mechanisms in an electronic device and, more specifically, to recordation of attempted breaches of data security mechanisms in an integrated circuit (IC) package.

Description of the Related Art

Electronic devices increasingly incorporate encryption schemes to secure communications or otherwise stymie access to protected data. Typically, this requires the storage of one or more keys in a secure location of the electronic device. However, as access to a stored key can provide access to the protected data, a malicious actor may attempt to breach security measures implemented by the electronic device to protect the stored key. Because the electronic device may have passed through the custody of multiple entities before the attempted breach is discovered, it often is useful to identify the specific point in time that the breach was attempted, and thus identify the entity having custody of the electronic device at that time.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
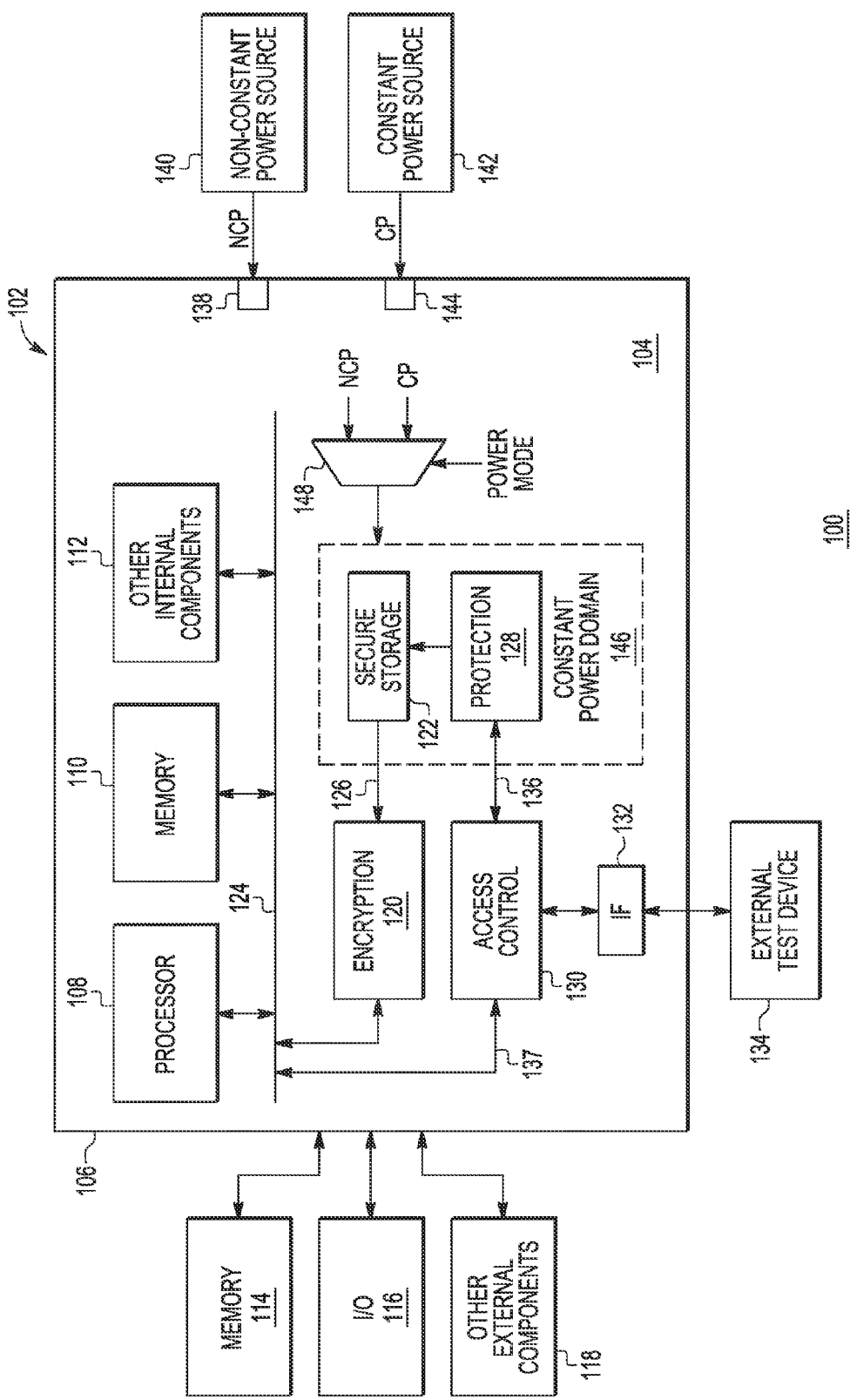
FIG. 1 is a block diagram illustrating a system comprising an electronic device having an integrated circuit (IC) package and an external test device in accordance with at least one embodiment of the present disclosure.

FIGS. 1-5 illustrate example techniques for recording a time of occurrence of an attempted breach of an IC package by an unauthorized entity to gain access to an encryption key or other sensitive datum. In at least one embodiment, the IC package includes a storage element and a protection component to protect access to the secure storage element. The protection component operates to detect an attempted breach of the IC package, and in response, determine a timestamp representative of the time at which the attempted breach is detected (hereinafter, the "breach timestamp"), encode the breach timestamp to generate a coded time value, and store the coded time value or other representation of the breach timestamp to the storage element of the IC package. In at least one embodiment, the storage element is a secure storage element that is used to store a key or other sensitive datum, and the protection component is configured to store the representation of the breach timestamp by overwriting the sensitive datum with the coded time value or other representation of the breach timestamp in the secure storage element. This serves the purpose of both rendering the sensitive datum inaccessible as well as recording a representation of the time of the detected attempted breach (hereinafter, "detected breach event") in a secure location for subsequent access by an authorized entity. In response to identifying the IC package as potentially breached, an authorized investigating entity may interface with the IC package to obtain the coded time value, decode the coded time value to obtain the original breach timestamp, and from this breach timestamp estimate or otherwise determine the point in time at which the detected breach event occurred. From this, the authorized entity may ascertain the custodian of the IC package at the time of the detected breach event, and from this information more readily identify the actor that attempted the breach of the IC package and take an appropriate course of action.

The operation of the secure storage element and the protection component may be powered by a non-constant power source that powers the electronic device implementing the IC package when the electronic device is in an operational mode. For example, the non-constant power source may comprise a battery or a "wall power source" that is disconnected from the IC package when the electronic device is deactivated or otherwise placed into a non-operational state. Further, in at least one embodiment, the secure storage element and the protection component may be implemented in a power domain of the IC package that has a separate, dedicated, constantly-on battery power source so that the protection component and the storage element may continue to operate when the non-constant power source is absent (e.g., not turned on) and the IC package is thus otherwise non-operational, such as before the IC package has been implemented in an electronic device, or has been implemented in an electronic device that is in an non-operational mode or "turned off." This constantly-on power source may be implemented as, for example, a small battery affixed to, or integrated with, the IC package or as a small battery implemented on a printed circuit board or other carrier for the IC package.

When the IC package is in an operational mode (that is, the non-constant power source is present), the breach timestamp indicating a time of detection of the attempted breach may be, for example, a timestamp accessed from a timer maintained by a functional unit of the IC package or from a timer maintained by a component external to the IC package (e.g., a day/time clock of a motherboard on which the IC package is implemented). In such instances, the breach timestamp may directly identify the time of the detected breach. Alternatively, when the IC package is in a non-operational mode (that is, the non-constant power source is absent), the protection component may include, for example, a timer that is activated in response to the detected breach event, and the timer continues to increment or otherwise update until an authorized entity accesses the IC package to investigate the detected breach event, in response to which the protection component accesses the current timestamp of the timer (which, in this case, serves as the breach timestamp), encodes the timestamp, and provides the resulting coded time value to the investigating entity. In such instances, the breach timestamp represents the time that has elapsed between the detected breach event and the investigating entity's query for the coded time value. From this elapsed time amount, the investigating entity may identify the time of the detected breach event.

For purposes of illustration, embodiments of the present disclosure are described in an example context of an encryption key as the sensitive datum protected by the protection component of the IC package. Thus, reference to the term "key" may be more fully understood to be reference to any type of sensitive datum, unless otherwise noted herein. Further, for ease of description, the expression "attempted breach" and its variants are used to refer to either a successful attempt to breach an IC package or an unsuccessful attempt to breach an IC package unless otherwise noted.

FIG. 1 illustrates an electronic system 100 employing time-based breach event extrapolation in accordance with at least one embodiment of the present disclosure. The electronic system 100 includes an electronic device 102, which may comprise any of a variety of electronic devices, such as a consumer electronic device (e.g., a tablet computer, a notebook computer, a computing-enabled cellphone, a computing-enabled wearable device, etc.), communications device (e.g., a router, a base station, a hub, etc.), a commercial or industrial device, (e.g., an automotive or aeronautical control system or an industrial-scientific-medical (ISM) control system), and the like. The electronic device 102 implements an IC package 104, which comprises one or more die (or chips), such as the illustrated substrate 106, packaged as a single integrated circuit.

In the depicted example, the IC package 104 comprises a data processing system-on-a-chip (SoC), and thus includes one or more processors 108, internal memory 110, and other internal processing components 112, such as input/output (I/O) controllers, co-processors or other accelerators, boot controllers, memory controllers, and the like. The operations of these components may be supplemented by various external components of the electronic device 102 that may be connected to the IC package 104, such as system memory 114, one or more I/O components 116, and other external components 118.

The IC package 104, in one embodiment, further includes an encryption component 120 to provide encryption and decryption functionality for the IC package 104. To illustrate, the electronic device 102 may comprise a set top box that receives a multimedia stream encrypted or otherwise encoded in accordance with a digital content management (DCM) scheme, decodes the encrypted multimedia stream using the encryption component 120, and then processes the decrypted multimedia stream for display or storage. As another example, the electronic device 102 may comprise an electronic control unit (ECU) that operates to encrypt communications transmitted to other ECUs using the encryption component 120, as well as to decrypt communications received from other ECUs using the encryption component 120. To facilitate the operation of the encryption component 120, the IC package 104 implements one or more secure storage elements 122, each to store a corresponding key utilized by the encryption component 120. For ease of illustration, a single secure storage element 122 is depicted in the example of FIG. 1. The secure storage element 122 may be implemented as any of a variety of non-volatile, reprogrammable/rewritable memory technologies, such as any of a variety of non-volatile random access memory (NVRAM) architectures.

As the secure storage element 122 stores a key or other sensitive datum, the IC package 104 may implement various security measures to prevent unauthorized access to the secure storage element 122. To illustrate, in some embodiments, the components 108, 110, 112, and 120 may be communicatively coupled via one or more host busses 124 or other interconnect fabrics, whereas the secure storage element 122 is isolated from these general access host busses via a separate direct interconnect 126 between the encryption component 120 and the secure storage element 122. While this arrangement may prevent a casual attempt to access the secure storage element 122, the secure storage element 122 may be susceptive to a concerted breach attempt, such as by de-encapsulating the IC package 104 to expose the conductive lines forming the interconnect 126, which then may be probed to observe the stored key. Thus, to prevent unauthorized access to the secure storage element 122, the IC package 104 further implements a protection component 128 coupled to the secure storage element 122. The protection component 128 operates in part to detect an attempt to breach the IC package 104. To this end, the protection unit 128 may be connected to a variety of sensors (not shown in FIG. 1) that may be used to indicate a package breach or other type of hacking attempt such as via a debug ports, and the like. In response to this detected breach event, protection component 128 renders the key unusable by overwriting the key in the secure storage element 122 with another value. As such, in the event that an unauthorized entity has the ability to access the secure storage element 122, the key previously stored therein is obliterated and thus access to the secure storage element 122 is rendered meaningless.

While preventing unauthorized access to the key is one aspect of the process of protecting sensitive information associated with the IC package 104, it often is just as important to identify who attempted to breach the IC package 104. To illustrate, there often is a long supply chain between the manufacturer of the IC package 104 and the final end user of the IC package 104. Identifying when the attempted breach occurred can facilitate identification of the unauthorized entity along the supply chain that attempted the breach. This in turn may uncover a systemic attempt to tamper with IC packages at a particular point in the distribution chain, and remedial action may be taken accordingly.

To this end, in at least one embodiment the protection component 128 further operates to note the time of a detected breach event in the form of a breach timestamp and store a representation of the breach timestamp in the secure storage element 122 (or in a separate storage element) so that it may be subsequently accessed by an investigating entity and used to infer or otherwise determine the time of the detected breach event. The stored representation of the breach timestamp may be an encoded representation of the breach timestamp (referred to herein as a "coded time value") so as to prevent unauthorized access to the original breach timestamp, or another representation of the breach timestamp (including the breach timestamp in its original form) may be recorded. Further, by storing the breach timestamp, or representation thereof, in the secure storage element 122, the breach timestamp is further isolated from unauthorized access or tampering through the security mechanisms implemented for the secure storage element 122.

To facilitate access to the representation of the breach timestamp stored in the secure storage element 122, the IC package 104 further includes an access control component 130 and an external interface 132 used by an external test device 134 deployed by an investigating entity to access the information stored in the secure storage element 122. The external interface 132 may comprise any of a variety of interfaces for this purpose, such as a general purpose input/output (GPIO) interface, an Inter-Integrated Circuit (I²C) interface, a Joint Test Action Group (JTAG) interface, a Universal Serial Bus (USB) interface, and the like. The access control component 130 is coupled to the secure storage element 122 via an isolated, direct interconnect 136 and coupled to the external interface 132 for direct access or via an interconnect 137, which may comprise the host bus 124 or a separate direct interconnect with the access control component 130 in order to use other interfaces located in the IC package 104, such as those used to communicate with external components 118. As described in greater detail herein, the external test device 134 operates to submit a request to access the IC package 104 (or more, particularly, a request to access the secure storage element 122) to the access control component 130 via the external interface 132 or other interfaces replacing other peripherals. In response to the access control component 130 successfully authenticating the request, the protection component 128 supplies the coded time value stored in the secure storage element 122 to the access control component 130 for output to the external test device 134. The external test device 134 then decodes the coded time value to obtain the breach timestamp, and from this breach timestamp determines the point in time at which the detected breach event occurred.

In other embodiments, software stored in the internal memory 110 and executed by the processor 108 may perform the role described herein with respect to the external test device 134. That is, the software may manipulate the processor 108 to submit a request to read the secure storage element 122, access the coded time value stored therein, and then decode the coded time value to obtain the original breach time stamp. Thus, reference herein to the operation of the external test device 134 alternatively may be interpreted as reference to a similar operation by such software unless otherwise noted.

An attempt to breach the IC package 104 may occur at any point in the lifecycle of the IC package 104, including before the IC package 104 is implemented in the electronic device 102 or after the IC package 104 is implemented in the electronic device 102. When the IC package 104 is implemented in the electronic device 102 and the electronic device 102 is in a powered-on, or operational, mode, the IC package 104 may receive power via an input 138 coupled to a power source 140 of the electronic device 102. As this power source 140 only supplies power to the IC package 104 when the electronic device 102 is in an operational mode, the power source 140 is referred to herein as "non-constant power source 140" and the power supplied by the non-constant power source 140 to the IC package 104 denoted "NCP" in FIG. 1. When the IC package 104 is receiving power from the non-constant power source 140, the protection component 128 may use the power from the non-constant power source 140 to power its operation. However, if the IC package 104 is not yet implemented in the electronic device 102, or if the electronic device 102 is not in an operational mode (that is, the power source 140 is absent from the perspective of the IC package 104), the protection component 128 does not have use of the non-constant power source 140 to power its operations.

Accordingly, in at least one embodiment, the IC package 104 also makes use of a separate, dedicated power source 142 used to provide power to the IC package 104 via an input 144 while the IC package 104 is not yet implemented in the electronic device 102 or when the electronic device 102 is in a non-operational mode. The power source 142 typically is implemented in the form of a battery that may be integrated with, or affixed to, the IC package 104, and which is constantly available to supply power when no other power source is present. To illustrate, the power source 142 may be implemented as a coin cell battery or button cell battery mounted on the substrate 106 and encapsulated within the IC package 104 or affixed to an external surface of the IC package 104. Because the power source 142 is thus available to provide constant power to the IC package 104 regardless of the presence or absence of the non-constant power source 140, the power source 142 is referred to herein as the "constant power source 142" and the power supplied by the constant power source 142 is denoted "CP" in FIG. 1. However, in some instances it may be impracticable to incorporate the power source 142 directly with the IC package 104, and thus the power source 142 instead may be implemented on, for example, the printed circuit board of the electronic device 102 on which the IC package 104 is mounted. In such instances, the power source 142 may provide power to the IC package 104 when the non-constant power from the non-constant power source 140 is absent, but the IC package 104 will not have power available when the IC package 104 is an unattached part, and thus breach detection and key protection functionality will not be available while the IC package 104 is an unattached part in such instances.

With the input 138 to receive power from the non-constant power source 140 when it is present and the input 144 to receive power from the constant power source 142 when the non-constant power source 140 is absent, the IC package 104 can power the operation of the protection component 128 regardless of whether the IC package 104 is an unattached part or implemented in an electronic device 102, and if so implemented, regardless of whether the electronic device 102 is in an operational mode or non-operational mode. However, to prevent excessive draw on the constant power source 142, in at least one embodiment the secure storage element 122 and the protection component 128 are implemented in a separate power domain 146 (also commonly referred to as a "power island") of the IC package 104. The IC package 104 includes switch circuitry 148 having inputs coupled to the inputs 138, 144, and which operates to provide a permanent supply of power to the power domain 146 from the power sources 140, 142. Thus, when the non-constant power source 140 is present, the non-constant power received via input 138 is provided as the constant power used to power the power domain 146, and when the non-constant power source 140 is absent, the constant power received via input 144 is provided as the permanent power used to power the power domain 146. In this manner, the protection component 128 may continuously operate to detect any breach attempts and to take protective action accordingly, as described in greater detail herein. Further, by isolating the protection component 128 and the secure storage element 122 in the power domain 146, minimal draw is made on the constant power source 142 at times when the IC package 104 is not implemented in an electronic device 102 or the electronic device 102 is in a non-operational mode.

Figure 2:
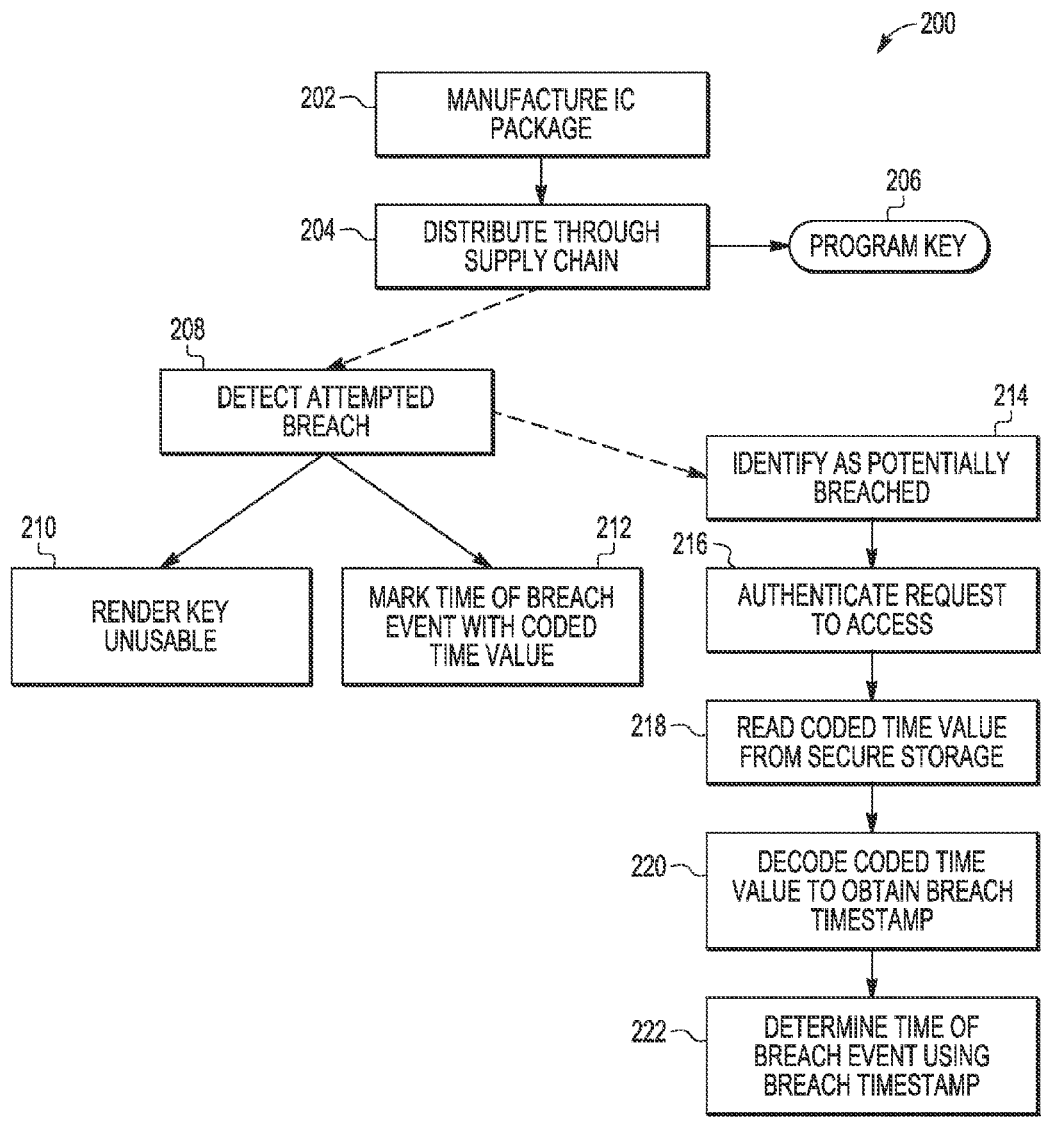
FIG. 2 is a flow diagram illustrating a method for recording a value representative of a time associated with an attempted breach of an IC package and extracting the recorded value to identify a time of occurrence of the attempted breach in accordance with at least one embodiment of the present disclosure.

FIG. 2 illustrates a flowchart depicting an example process 200 of recording and subsequently determining a time of a detected breach attempt on an IC package during its distribution through a supply chain in accordance with at least one embodiment. The process 200 initiates at block 202, whereby a manufacturer fabricates the IC package 104. As part of the fabrication process, the manufacturer may incorporate or affix the constant power source 142 to the IC package 104, and thus provide power for operating the protection component 128 from the point of manufacture. At block 204, the manufacturer releases the IC package 104 into a supply chain that may include one or more distributors, shippers, original equipment manufacturer (OEM) that incorporates the IC package 104 into an electronic device 102, a user of the electronic device 102, and the like. At some point during its traversal of the supply chain, the secure storage element 122 of the IC package 104 is programmed with a key or other sensitive datum, as represented by block 206. This key programming may be performed by the manufacturer, by the OEM, by the final user, or at some point in between. When the secure storage element 122 is programmed with the key, the protection component 128 is activated and begins to monitor for breach attempts.

At some point in the supply chain, an unauthorized entity attempts to breach the IC package 104 to gain access to the key. At block 208, the protection component 128 detects this attempted breach. Typically, a breach attempt is detected through one or more changes in the physical environment of the IC package 104 suggestive of physical tampering with the IC package 104, or through attempts to interface the IC package 104 through one or more interfaces in ways indicative of an attempt to hack the IC package 104. The physical changes can include, for example, changes in temperature, in voltage of a supply voltage to the IC package 104 or a supply voltage internal to the IC package, changes in clock frequency, mechanical sensors (e.g., strain sensors or discontinuity sensors) that detect a physical breach in the IC package 104, and the like. In detecting hack attempts through an external interface of the IC package 104, the breach detection component 302 may employ configured logic that that monitors the debug ports or monitors for known back doors that might be used as hacking point. In response to the detected breach event, at block 210 the protection component 128 renders the key unusable by overwriting it with another value in the secure storage element 122 and at block 212 the protection component 128 marks the time of the detected breach event for subsequent access by an investigating entity.

As described in greater detail below, in instances where the IC package 104 is implemented in an electronic device 102 and the electronic device 102 is in an operational mode at the time of the attempted breach, the protection component 128 may sample a timestamp from a timer maintained by a functional unit of the IC package 104 or a timer maintained by another component of the electronic device 102 in response to the attempted breach event, encode this timestamp to generate a coded time value. The electronic device 102 then may and overwrite the key with the coded time value in the secure storage element 122. This both renders the key unusable (block 210) and recording a representation of the time of the detected breach event through this process (block 212). Otherwise, in instances where the IC package 104 is not yet implemented in an electronic device 102 or the electronic device 102 is in a non-operational mode, the protection component 128 may write a zeroing value to the secure storage element 122 (block 210) in response to the detected attempted breach event. Concurrently, the protection component 128 may start an internal timer in response to the detected breach event, and then when an investigating entity subsequently attempts to access the secure storage element 122, the protection component 128 may sample the timer at that later time to obtain a breach timestamp, encode the breach timestamp to generate the coded time value, store the coded time value to the secure storage element 122, and provide the coded time value from the secure storage element 122 to the external test device 134 of the investigating entity (block 212). In such instances, the breach timestamp, and its encoded version, represent the time that has elapsed since the attempted breach event, rather than a direct reference to a specific point in time.

Subsequent to the detected breach event, the IC package 104 is delivered to the custody of an entity having an interest in the integrity of the IC package 104 (that is, an "investigating entity"). For example, the OEM implementing the IC package 104 into an electronic device 102 may desire to ensure that the IC package 104 has not been compromised before the IC package 104 is placed into the electronic device 102. Thus, at block 214 the investigating entity couples the IC package 104 to the external test device 134 and identifies the IC package 104 as having been subject to an attempted breach, such as through a status indicator set by the protection component 128 set in response to the detected breach event. In response, at block 216 the external test device 134 and the access control component 130 interact to authenticate a request to access the IC package 104 to obtain the representation of the breach timestamp stored therein. Assuming successful authentication and the breach status indicator is set, at block 218 the access control component 130 reads the coded time value from the secure storage element 122 and provides the coded time value to the external test device 134. Otherwise, if the breach status indicator is not set, the external test device 134 is denied access to the secure storage element.

At block 220 the external test device 134 decodes the coded time value to obtain the original breach timestamp, and at block 222 the external test device 134 uses the original breach timestamp to determine the point in time at which the attempted breach was detected. In instances where the breach timestamp comprises a sampled timer from the IC package 104 or the electronic device 102 while the electronic device 102 is operational, the breach timestamp may directly represent a particular point in time, and this particular point in time is thus interpreted as the time of occurrence of the attempted breach. In instances where the breach timestamp comprises a timestamp sampled from a timer initiated in response to the attempted breach, the breach timestamp represents an elapsed time since the attempted breach, and thus may be used to calculate when the attempted breach occurred in the past. With the point in time of the attempted breach so identified, the investigating entity may then identify the custodian of the IC package 104 (or intended custodian) at that point of time, and thus focus the investigation into the identity of the entity that attempted the breach.

Figure 3:
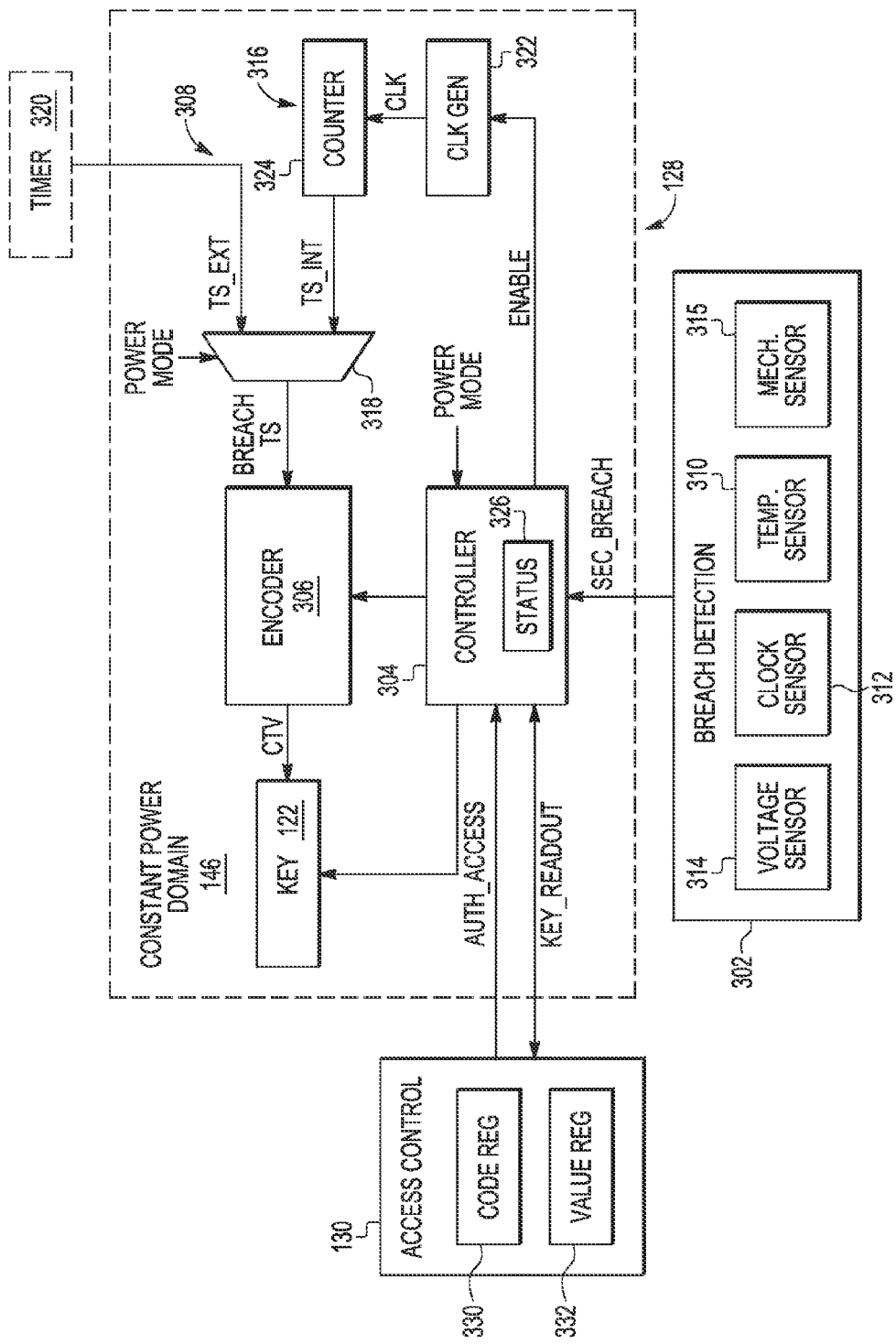
FIG. 3 is a block diagram illustrating an example implementation of a protection component of the IC package of FIG. 1 in accordance with at least one embodiment of the present disclosure.

FIG. 3 illustrates an example implementation of the secure storage component 122, the protection component 128, and the access control component 130 of the IC package 104 in accordance with at least one embodiment. In the depicted example, the protection component 128 includes a breach detection component 302, a controller 304, an encoder 306, and a time detection component 308. In at least one embodiment, the breach detection component 302 (which is located outside of the power domain 146) operates to detect an attempted breach to the IC package 104, and thus may include one or more sensors to detect indicia of an attempted breach, such as a temperature sensor 310 to detect changes in temperature, a clock sensor 312 to detect changes in a frequency of a clock of the IC package 104, a voltage sensor 314 to detect deviations in one or more supply voltages of the IC package 104, one or more mechanical sensors 315 (e.g., a strain sensor, vibration sensor, or discontinuity sensor) to detect a physical manipulation of the IC package 104 indicative of a potential breach, and the like. In the case of the mechanical sensor 315, these sensors may operate to convert the mechanical force associated with the attempted package breach to an electrical signal used to signal a breach event.

The time detection component 308 operates to determine a breach timestamp representative of the time at which a detected breach event occurred, and further operates to store a representation of the breach timestamp in the secure storage element 122, either directly or via the encoder 306. In the illustrated example, the time detection component 308 comprises an internal timer 316 and switch logic 318 having one input coupled to the output of the internal timer 316, another input coupled to an external timer 320 (that is, a timer of the IC package 104 or a timer of another component of the electronic device 102 that is coupled to the IC package 104), and an output to provide a breach timestamp (denoted "BREACH TS" in FIG. 3). The breach timestamp is selected from either a timestamp sampled from the external timer 320 (denoted "TS_EXT" in FIG. 3) or a timestamp sampled from the internal timer 316 (denoted "TX_INT" in FIG. 3) depending on current power mode of the power domain 146 (that is, whether the power domain 146 is operating on power from the constant power source 142 or power from the non-constant power source 140). The internal timer 316 comprises a clock generator 322 to provide a clock signal (denoted "CLK" in FIG. 3) and a counter 324 having an input to receive the clock signal and to increment or otherwise update a stored count value based on cycles of the clock signal CLK. In at least one embodiment, the clock generator 322 may be implemented as a known number of delay chains to produce a clock signal with a known frequency, and may be implemented without a phase locked loop (PLL) so as to reduce power consumption.

The encoder 306 includes an input coupled to the output of the time detection component 308 to receive the breach timestamp and an output coupled to the secure storage element 122 so as to overwrite the contents stored therein with a coded time value (denoted "CTV" in FIG. 3) generated from the received breach timestamp. In at least one embodiment, the encoder 306 implements wired mesh logic (e.g., XOR logic) that operates to encode the breach timestamp using a confidential encoding function that may be reversed through application at the external test device of a decoding function that is the complementary function or inverse function of the encoding function. Accordingly, in at least one embodiment, the wired mesh logic may be programmable through fuses or other programmable elements after manufacture of the IC package 104 to implement a specified encoding function, and thus helping to maintain the confidentiality of the encoding function. Further, to ensure that the key is completely overwritten by the coded time value, and to give the coded time value the appearance of a key so as to further thwart an attempted breach of the key, the encoder 306 may be configured so that the coded time value is generated so as to be the same size of the key and otherwise have the format of a valid key.

The controller 304 is coupled to the secure storage element 122, the encoder 306, the time detection component 308, and the breach detection component 302, and operates to coordinate the operations of these components through various signaling. Further, as described below, the controller 304 may maintain a status indicator 326 accessible to the external test device 134 via the access control component 130 and which is set in response to a detected breach event and thus may be used by the external test device 134 to determine whether the IC package 104 was subjected to an attempted breach. Further, in some embodiments, the status indicator 326, once set, cannot be reset until the constant power source 142 is disconnected from the IC package 104, thus preventing an unauthorized entity from covering up the attempted breach by resetting the status indicator 326.

Figure 4:
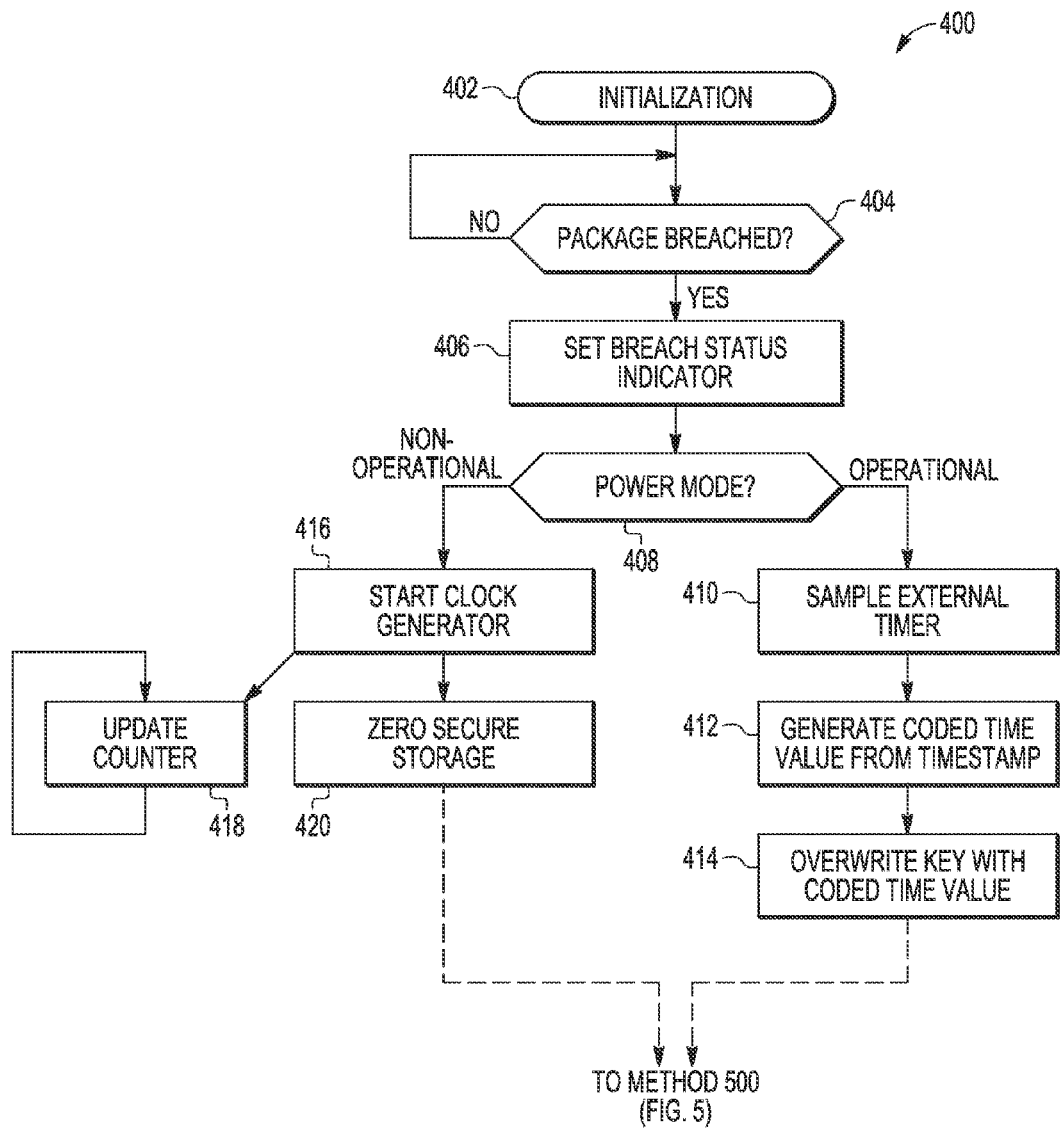
FIG. 4 is a flow diagram illustrating a method for recording an encoded timestamp representative of a time of an attempted breach of an IC package using a secure storage element of the IC package in accordance with at least one embodiment of the present disclosure.

FIG. 4 illustrates an example method 400 for recording an encoded timestamp representative of a time of a detected attempted breach of an IC package using a secure storage element of the IC package in accordance with at least one embodiment of the present disclosure. The method 400 is described in the example context of the IC package 104 of FIGS. 1 and 3. At block 402 the IC package 104 is initialized, such as through the programming of the key into the secure storage element 122, through the connection of the constant power source 142 to the IC package 104, and the like. After initialization, at block 404 the breach detection component 302 monitors its sensors for an indication of an attempted breach. In response to detecting an attempted breach, the breach detection component 302 signals a detected breach event by asserting a signal SEC_BREACH (FIG. 3). In response to the assertion of this signal, at block 406 the controller 304 sets the status indicator 326, thereby marking the IC package 104 as subjected to an attempted breach and initiating the key protection process. With the detected breach event, at block 408 the controller 304 determines the current power mode of the IC package 104: operational (power from the non-constant power source 140 is present) or non-operational (power from the non-constant power source 140 is absent).

If the power mode is the operational mode, the IC package 104 is implemented in an electronic device 102 is operational, and thus at block 410 the time detection component 308 samples the external timer 320 to obtain a timestamp from the external timer 320 and provides this timestamp as a breach timestamp to the encoder 306. At block 412 the encoder 306 encodes the breach timestamp to generate a coded time value, and at block 414 the encoder 306 overwrites the key in the secure storage element 122 with the coded time value. Thus, at this point the key has been rendered unusable by being overwritten and the protection component 128 has recorded a representation of the time at which the attempted breach occurred in the form of the coded time value in the secure storage element 122.

Returning to block 408, if the power mode is the non-operational mode, the IC package 104 either not yet implemented in an electronic device 102 or the electronic device 102 is non-operational, and thus the protection component 128 is to rely on its internal timer 316 for marking the timing of the detected attempted breach. Accordingly, at block 416 the controller 304 enables, or starts, the clock generator 322 of the internal timer 316 through assertion of a signal ENABLE (FIG. 3). The enabled clock generator 322 outputs the signal CLK, which in turn causes the counter 324 of the internal timer 316 to update its stored count value with each clock cycle at block 418, and thus the count value of the counter 324 marks the amount of time that has elapsed since the detected breach event. At block 420, the controller 304 renders the key unusable by zeroing-out the secure storage element 122, such as by signaling the encoder 306 to write a zeroing value (e.g., all 0's, all 1's, or a random number) to the secure storage element 122, or by asserting a signal provided to the secure storage element 122 that triggers logic of the secure storage element 122 to automatically zero out each storage bit.

After the key has been rendered useless and the timing of the detected breach event has been marked, the method 400 concludes and the IC package 104 continues through the supply chain until the attempted breach is identified and processed by an investigating entity, which is described in greater detail below.

Figure 5:
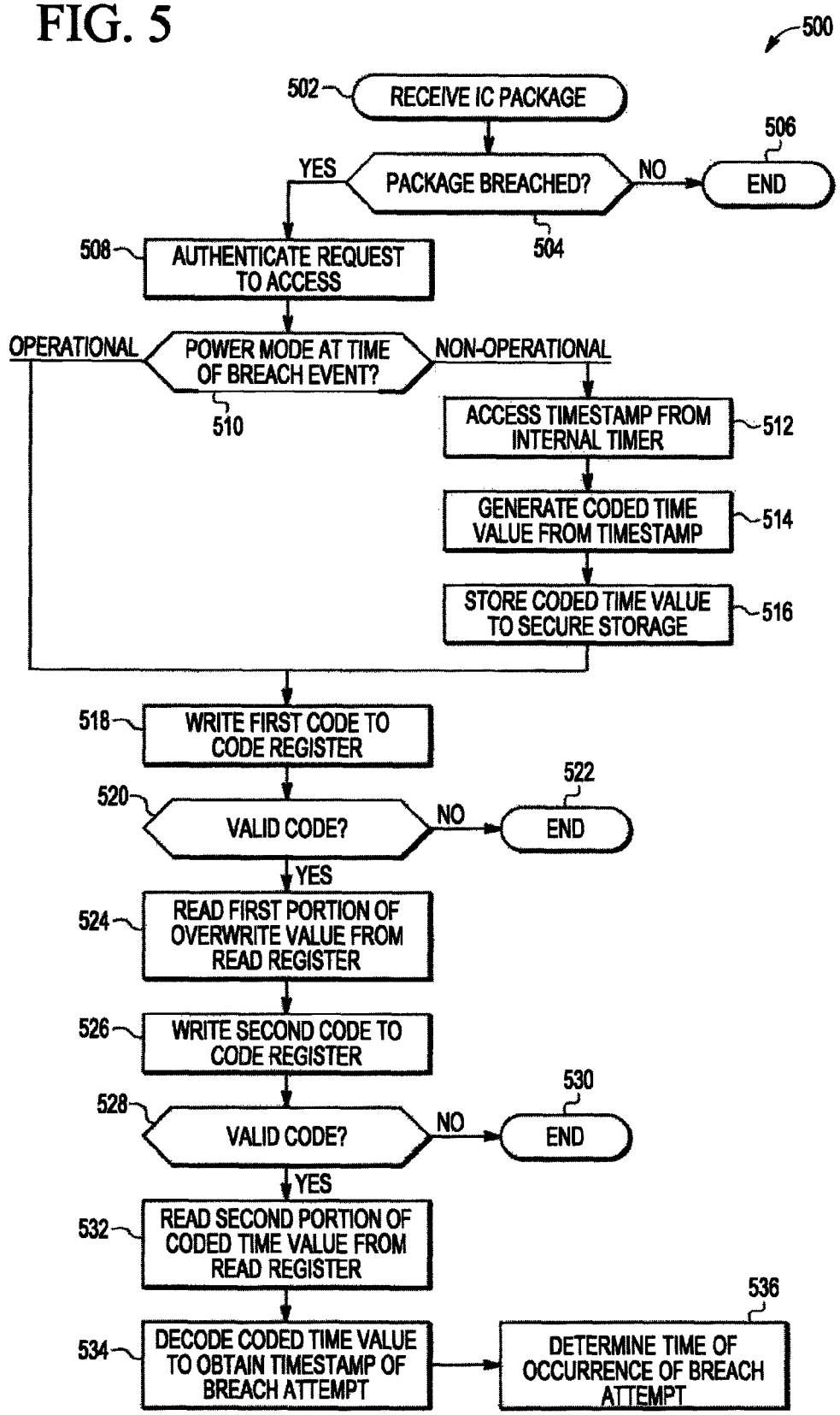
FIG. 5 is a flow diagram illustrating a method for accessing a representation of timing of an attempted breach of an IC package from a secure storage element of the IC package and determining a time of occurrence of the attempted breach in accordance with at least one embodiment of the present disclosure.

FIG. 5 illustrates an example method 500 for accessing a representation of a timing of a detected breach event from a secure storage element of an IC package and determining the time of occurrence of the detected breach event in accordance with at least one embodiment of the present disclosure. The method 500 is described in the example context of the IC package 104 of FIGS. 1 and 3. At block 502 an investigating entity assumes custody of the IC package 104 at some point in the supply chain and connects the external test device 134 to the IC package 104. At block 504 the investigating entity determines whether an attempt to breach the IC package 104 was made. As noted above, the controller 304 may set a status indicator 326 in response to a detected breach event, and the external test device 134 may determine the breach status of the IC package by accessing the status indicator 326. If no breach attempt was detected, at block 506 the IC package 104 is accepted as uncompromised and further processed in the supply chain.

Otherwise, if a breach attempt is detected, at block 508 the external test device 134 submits a request to access the secure storage element 122 to the access control component 130, which may employ a challenge/response process or other authentication process to authenticate the request. In response to the request being successfully authenticated, at block 510 the controller 304 determines the power mode that was in effect at the time of the detected breach event (which may be indicated, for example, as part of the status indicator 326). In the event that the power mode was the operational mode, the secure storage element 122 already contains a coded time value representing the timing of the detected breach event, and thus the controller 304 does not need to take any further action with respect to preparing a coded time value.

However, if the power mode was the non-operational mode, at this point the secure storage element 122 contains a zeroed-out value rather than a coded time value. However, as described above, the internal timer 316 was previously started at the time of detection of the attempted breach and thus the current count value stored in the counter 324 of the internal timer 316 represents the current time that has elapsed since the detected breach event. As such, at block 512 the time detection component 308 samples the current count value of the counter 324 as the breach timestamp and supplies the breach timestamp to the encoder 306. At block 514 the encoder 306 encodes this breach timestamp to generate a coded time value, and at block 516 the encoder overwrites the zeroed-out value in the secure storage element 122 with the coded time value.

With the request to access the secure storage element 122 authenticated (and an coded time value stored in the secure storage element 122 in the event that the represented breach timestamp is obtained from the internal timer 316), the external test device 134 initiates the process of reading the coded time value from the secure storage element 122 (denoted as signaling "KEY_ READOUT" in FIG. 3). To provide enhanced security, the access control component 130 implements a two-step read process described below. However, any of a variety of processes for providing secure read-out of the coded time value in the secure storage element 122 to the external test device 134 may be implemented. For the two-step read-out process, the access control component 130 utilizes two registers, code register 330 (FIG. 3) and read register 332 (FIG. 3), which may comprise a set of "hidden" registers with confidential, or "hidden", addresses that are fixed or programmed through fuses, and which may be programmed to return "0" or a null value unless the status indicator 326 is set. To access the coded time value using the registers 330, 332, at block 518 the external test device 134 writes a confidential first code to the code register 330 and at block 520 the access control component 130 compares the first code to an expected code value to determine whether the first code is a valid code. If the first code is not a valid code, at block 522 the access control component 130 deauthorizes the external test device 134 and prevents any further access. That is, an attempt to read the secure storage element 122 without a breach indicated will result in a security violation and thus trigger a lockdown of the IC package 104 so as to prevent back door access to the protected datum.

Otherwise, if the first code is a valid code, at block 524 the access control component 130 accesses a first portion of the secure storage element 122 (e.g., the first half of the bits) and writes the bit values of this first portion to the read register 332, which then may be read by the external test device 134. Then, at block 526, the external test device 134 writes a second code to the code register 330. The second code may be an offset from the first code, an internal address, etc. At block 528, the access control component 130 compares the second code with an expected code value to determine whether the second code is a valid code. If not, at block 530 the access control component 130 deauthorizes the external test device 134 and prevents any further access. Otherwise, if the second code is a valid code, at block 532 the access control component 130 accesses a remaining portion of the secure storage element 122 (e.g., the second half of the bits) and writes the bit values of this remaining portion to the read register 332, which then may be read by the external test device 134.

With the conclusion of block 532, the external test device 134 has been provided the entire coded time value from the secure storage element 122. Accordingly, at block 534 the external test device 134 decodes the coded time value to obtain the original breach timestamp. To decode the coded time value, the external test device 134 may employ, for example, a decoder that applies a decoding function to the coded time value that is the complement, or inverse, of the encoding function applied by the encoder 306. At block 536, the external test device 134 or the investigating entity determines the time at which the attempted breach occurred using the breach timestamp. As described above, when the non-constant power is present when the attempted breach is detected, the breach timestamp would have been accessed from an active timer of the electronic device 102 and thus the breach timestamp directly points to the time of occurrence of the detected breach event. For example, the active timer may be a day:hour:second timer that provides a timestamp that expressly identifies the day, hour, and second, or the active timer may be a timer that counts the clock cycles that have occurred from a defined event (such as the latest reset), and with the clock frequency and the timestamp the point in time may be determined as a corresponding amount of time that has occurred since this defined event.

When non-constant power is not present when the attempted breach is detected, the breach timestamp was accessed from the internal timer 316 and represents the amount of time that elapsed from the time at which the attempted breach was detected and the time at which the request for access from the external test device 134 was authenticated. Thus, with the knowledge of the point in time that the external device 134 as authenticated and the clock frequency of the internal timer 316, the time of occurrence of the attempted breach may be identified by subtracting the elapsed time represented by the breach timestamp from the point in time that the external device was authenticated.

Further, as noted above, with the time of occurrence of the attempted breach identified, the investigating entity may more easily identify the entity having custody of the IC package at that time, and thus more readily identify the unauthorized entity that attempted to breach the IC package 104. This in turn facilitates the taking of remedial action, such as by improving security measures by the custodial entity, using a different entity for that position in the supply chain, and the like.

In accordance with one aspect of the present disclosure, a method in an IC package is provided. The method includes determining a breach timestamp associated with a time of occurrence of an attempted breach to the IC package, and storing a representation of the breach timestamp at the IC package. Storing a representation of the breach timestamp may include overwriting a sensitive datum in a secure storage element of the IC package. The method further may include storing a representation of the breach timestamp comprises overwriting a sensitive datum in a secure storage element of the IC package.

In accordance with yet another aspect, a method includes: in response to an attempted breach to an integrated circuit (IC) package while the IC package is using a battery power source in a non-operational mode: activating a clock generator of the IC package; and adjusting a counter of the IC package based on a clock signal provided by the clock generator. The method further may include, responsive to a request to access the IC package by an external device after the attempted breach: accessing a timestamp from the counter; and providing a representation of the timestamp to the external device. The method also may include overwriting a sensitive datum in a secure storage element of the IC package with a zeroing value responsive to the attempted breach, overwriting the zeroing value in the secure storage element with the representation of the timestamp in response to the request to access. Providing the representation of the timestamp to the external device may include providing the representation of the timestamp from the secure storage element to the external device. The method further may include determining an amount of time that has elapsed from the time of the attempted breach based on the representation of the timestamp.

In accordance with yet another aspect, an integrated circuit (IC) package includes a storage element and a protection component coupled to the storage element. The protection component includes a breach detection component configured to detect an attempted breach of the IC package. The protection component further includes a time detection component configured to determine a breach timestamp associated with a time of occurrence of the attempted breach and configured to store a representation of the breach timestamp in the storage element. The storage element may be configured to store a sensitive datum, and the time detection component may be configured to store the representation of the breach timestamp by overwriting the sensitive datum in the storage element with the representation of the breach timestamp.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In an integrated circuit (IC) package, a method comprising:
    determining a breach timestamp associated with a time of occurrence of an attempted breach to the IC package;
    determining a coded time value based on the breach timestamp;
    storing a representation of the breach timestamp at the IC package, wherein the storing the representation of the breach timestamp comprises overwriting a sensitive datum with the coded time value in a secure storage element of the IC package; and
    ascertaining a custodian of record at the time of occurrence of the attempted breach of the integrated circuit package based on the coded time value.

2. The method of claim 1, further comprising:
    providing the representation of the breach timestamp to an external device responsive to authenticating a request to access the IC package from the external device after the attempted breach.

3. The method of claim 2, further comprising:
    determining the time of occurrence of the attempted breach based on the representation of the breach timestamp.

4. The method of claim 3, wherein:
    storing the representation of the breach timestamp comprises determining the coded time value by applying an encoding function to the breach timestamp at an encoder of the IC package; and
    determining the time of occurrence of the attempted breach comprises decoding the coded time value by applying a decoding function to the coded time value using the external device to generate the breach timestamp, the decoding function being an inverse function of the encoding function.

5. The method of claim 1, wherein:
determining the breach timestamp associated with the time of occurrence of the attempted breach comprises obtaining a timestamp from a timer of an electronic device implementing the IC package in response to the attempted breach occurring while the electronic device is in an operational mode using a non-constant power source, wherein the breach timestamp comprises the timestamp obtained from the timer, and wherein the timer is powered by the non-constant power source.

6. The method of claim 1, wherein:
determining the breach timestamp associated with the time of occurrence of the attempted breach comprises:
activating a clock generator powered by a constant power source that is dedicated to the IC package responsive to the attempted breach occurring while the IC package is in a non-operational mode using the constant power source;
adjusting a counter based on a clock signal provided by the clock generator;
receiving a request to access the IC package from an external device subsequent to activating the clock generator; and
obtaining a timestamp from the counter responsive to receiving the request, the breach timestamp comprising the timestamp obtained from the counter.

7. The method of claim 6, further comprising:
overwriting the sensitive datum in the secure storage element of the IC package with a zeroing value prior to overwriting the sensitive datum with the coded time value responsive to detecting the attempted breach.

8. The method of claim 6, further comprising:
providing the representation of the breach timestamp to the external device responsive to authenticating the request.

9. A method comprising:
in response to an attempted breach to an integrated circuit (IC) package while the IC package is using a battery power source in a non-operational mode:
activating a clock generator of the IC package;
adjusting a counter of the IC package based on a clock signal provided by the clock generator;
overwriting a sensitive datum in a secure storage element of the IC package with a coded time value based on a timestamp obtaining from the counter; and
ascertaining a custodian of record at the time of occurrence of the attempted breach of the integrated circuit package based on the coded time value.

10. The method of claim 9, further comprising:
responsive to a request to access the IC package by an external device after the attempted breach:
accessing the timestamp from the counter; and
providing a representation of the timestamp to the external device.

11. The method of claim 10, further comprising:
overwriting the sensitive datum in the secure storage element of the IC package with a zeroing value responsive to the attempted breach;
overwriting the zeroing value in the secure storage element with the representation of the timestamp in response to the request to access; and wherein providing the representation of the timestamp to the external device comprises providing the representation of the timestamp from the secure storage element to the external device.

12. The method of claim 10, further comprising:
determining an amount of time that has elapsed from the time of the attempted breach based on the representation of the timestamp.

13. An integrated circuit (IC) package comprising:
a storage element; and
a protection component coupled to the storage element and comprising:
a breach detection component configured to detect an attempted breach of the IC package;
a time detection component configured to determine a breach timestamp associated with a time of occurrence of the attempted breach and configured to store a representation of the breach timestamp in the storage element,
the time detection component to store the representation of the breach timestamp by overwriting a sensitive datum in the storage element with the representation of the breach timestamp; and
the time detection component to provide the breach timestamp for encoding to ascertain a custodian of record at the time of occurrence of the attempted breach of the integrated circuit package.

14. The IC package of claim 13, further comprising:
an interface coupleable to an external device; and
an access control component coupled to the interface and to the storage element, the access control component configured to provide the representation of the breach timestamp from the storage element to an external device via the interface in response to authenticating a request to access the storage element from the external device.

15. The IC package of claim 13, wherein:
the storage element is configured to store a sensitive datum; and
the time detection component is configured to store the representation of the breach timestamp by overwriting the sensitive datum in the storage element with the representation of the breach timestamp.

16. The IC package of claim 13, wherein the protection component further comprises:
an encoder coupled to the time detection component and the storage element, the encoder configured to encode the breach timestamp to generate an encoded time value, wherein the representation of the breach timestamp comprises the encoded time value.

17. The IC package of claim 13, wherein:
the IC package further comprises an input to receive a non-constant power source; and
the time detection component is configured to determine the breach timestamp by accessing a timestamp from a timer powered by the non-constant power source when the breach detection component detects the attempted breach in the presence of the non-constant power source.

18. The IC package of claim 13, wherein:
the IC package further comprises an input to receive a constant power source and an input to receive a non-constant power source; and
the protection component further comprises:
a clock generator powered by the constant power source;

a counter coupled to an output of the clock generator and powered by the constant power source; and a controller configured to enable the clock generator responsive to the attempted breach in an absence of the non-constant power source;

an access control component configured to receive and authenticate a request to access the storage element from an external device; and wherein the time detection component is to determine the breach timestamp by accessing a timestamp from the counter responsive to the access control component receiving the request, the breach timestamp comprising the accessed timestamp.

\* \* \* \* \*